United States Patent
Sugioka et al.

(10) Patent No.: US 10,504,052 B2
(45) Date of Patent: Dec. 10, 2019

(54) NAVIGATION UNIT AND METHOD FOR PROVIDING NAVIGATION INSTRUCTIONS FOR AN AUTONOMOUS VEHICLE

(71) Applicant: VOLVO CAR CORPORATION, Gothenburg (SE)

(72) Inventors: Ichiro Sugioka, Newbury Park, CA (US); Aric Dromi, Lerum (SE); Kari Kauppi, Ventura, CA (US)

(73) Assignee: Volvo Car Corporation, Gothenburg (SE)

( * ) Notice: Subject to any disclaimer, the term of this patent is extended or adjusted under 35 U.S.C. 154(b) by 757 days.

(21) Appl. No.: 14/991,260

(22) Filed: Jan. 8, 2016

(65) Prior Publication Data
US 2016/0210590 A1 Jul. 21, 2016

(30) Foreign Application Priority Data
Jan. 16, 2015 (EP) .................................... 15151356

(51) Int. Cl.
G06Q 10/08 (2012.01)
G08G 1/14 (2006.01)
G01C 21/34 (2006.01)

(52) U.S. Cl.
CPC ... G06Q 10/08355 (2013.01); G01C 21/3415 (2013.01); G08G 1/144 (2013.01)

(58) Field of Classification Search
CPC combination set(s) only.
See application file for complete search history.

(56) References Cited

U.S. PATENT DOCUMENTS 5,774,069 A * 6/1998 Tanaka .................. B60T 7/12
180/167
8,078,349 B1 * 12/2011 Prada Gomez ...... G05D 1/0061
701/1

(Continued)

FOREIGN PATENT DOCUMENTS

| JP | H11213292 | 8/1999 |
| JP | 2010152728 | 7/2010 |
| JP | 2012184974 | 9/2012 |

OTHER PUBLICATIONS

Extended European Search Report for European Application No. EP 14180830.3, Completed by the European Patent Office, dated Feb. 25, 2015, 5 Pages.

(Continued)

*Primary Examiner* — Thomas G Black
*Assistant Examiner* — Ana D Thomas
(74) *Attorney, Agent, or Firm* — Brooks Kushman P.C.

(57) ABSTRACT

Example embodiments presented herein are directed towards a navigation unit, and corresponding method therein, for providing navigation instructions for an autonomous vehicle configured to be in an autonomous driving mode while in a certified autonomous road. The navigation unit is first configured to determine the autonomous vehicle is driving in an unplanned route or that the autonomous vehicle is deviating from a planned route. Thereafter, a trigger for routing the autonomous vehicle to a certified autonomous road is identified. The trigger is based on at least one of a current location, a time and date, a driving history or a calendar event. After the determination and identification previously described is performed, the vehicle is navigated to the certified autonomous road. Upon entering the road, and therefore being in an autonomous driving mode, a display screen will engage the driver so that the driver may input route planning information. Therefore, the (Continued)

navigation unit only interacts with the driver once the vehicle is in the autonomous driving mode. The example embodiments have the advantage of providing navigation without requiring an interaction with a driver operating a vehicle in a manual driving mode.

16 Claims, 4 Drawing Sheets

(56) References Cited

U.S. PATENT DOCUMENTS

| | | | | |
|---|---|---|---|---|
| 8,874,301 | B1* | 10/2014 | Rao | B60K 28/066 |
| | | | | 701/25 |
| 9,194,168 | B1* | 11/2015 | Lu | E05F 15/70 |
| 9,280,901 | B2* | 3/2016 | Chen | G08G 1/167 |
| D755,232 | S * | 5/2016 | Jutte | D14/491 |
| 9,436,182 | B2* | 9/2016 | Nemec | G05D 1/0055 |
| 9,463,793 | B2* | 10/2016 | Lind | B60W 30/00 |
| 9,470,537 | B2* | 10/2016 | Raghu | G01C 21/30 |
| 9,550,529 | B2* | 1/2017 | Oh | G08G 1/167 |
| 9,609,046 | B2* | 3/2017 | Fowe | G01C 21/26 |
| 9,625,264 | B1* | 4/2017 | Imanishi | G01C 21/3638 |
| 9,733,096 | B2* | 8/2017 | Colijn | G01C 21/343 |
| 9,959,624 | B2* | 5/2018 | Raghu | G06K 9/00798 |
| 10,025,996 | B2* | 7/2018 | Raghu | G06K 9/00798 |
| 10,101,743 | B2* | 10/2018 | Abe | G05D 1/0061 |
| 10,126,136 | B2* | 11/2018 | Iagnemma | G05D 1/0088 |
| 10,156,448 | B2* | 12/2018 | Geelen | G01C 21/32 |
| 2009/0005987 | A1* | 1/2009 | Vengroff | G06Q 30/02 |
| | | | | 701/300 |
| 2010/0250023 | A1* | 9/2010 | Gudat | E02F 9/2045 |
| | | | | 701/2 |
| 2012/0078509 | A1* | 3/2012 | Choi | G01C 21/3415 |
| | | | | 701/423 |
| 2012/0092190 | A1 | 4/2012 | Stefik et al. | |
| 2013/0190964 | A1* | 7/2013 | Uehara | G01C 21/3691 |
| | | | | 701/25 |
| 2013/0345961 | A1* | 12/2013 | Leader | G01C 21/20 |
| | | | | 701/410 |
| 2014/0081517 | A1* | 3/2014 | Barrett | B60K 35/00 |
| | | | | 701/36 |
| 2014/0358353 | A1* | 12/2014 | Ibanez-Guzman | |
| | | | | G05D 1/0027 |
| | | | | 701/23 |
| 2015/0006028 | A1* | 1/2015 | Strauss | B62D 1/28 |
| | | | | 701/36 |
| 2016/0103512 | A1* | 4/2016 | Edgren | B60K 37/06 |
| | | | | 345/173 |
| 2016/0229414 | A1* | 8/2016 | Desnoyer | B60W 50/0097 |

OTHER PUBLICATIONS

European Search Report for European Application No. EP 15151356.1, completed by the European Patent Office, dated Jul. 29, 2015, 2 pages.

* cited by examiner

NAVIGATION UNIT AND METHOD FOR PROVIDING NAVIGATION INSTRUCTIONS FOR AN AUTONOMOUS VEHICLE

CROSS-REFERENCE TO RELATED APPLICATIONS

This application claims foreign priority under 35 U.S.C. 119(a)-(d) to European patent application number EP15151356.1, filed Jan. 16, 2015, which is incorporated by reference in its entirety.

TECHNICAL FIELD

Example embodiments presented herein are directed towards a navigation unit, and corresponding method, for providing navigation instructions to an autonomous vehicle.

BACKGROUND

An autonomous vehicle is one that is capable of sensing its environment and navigating without the use of human input. It is envisioned that such vehicles will be capable of transitioning from an autonomous driving mode and a manual driving mode, in which a driver manually operates the vehicle. It is further envisioned that such autonomous driving may only be allowed on preapproved or certified roads or zones. Thus, a vehicle's initial driving segment will likely require the human driver to control the vehicle and later transition to an autonomous driving mode. While in an autonomous driving mode, a driver of a vehicle may engage in activities that may not be possible while the vehicle is in a manual driving mode. Examples of such activities are reading, working or using multimedia applications.

SUMMARY

In the foreseeable future in regions with existing road infrastructure, it is unlikely that the entire driving route will involve autonomous driving. Furthermore, it is likely that the initial portion of a driving route will comprise a manual driving mode since autonomous driving will only be allowed on certified roads. For the driver to best handle the driving demands while the vehicle is in a manual driving mode, it is considered beneficial to limit requests to the driver for any information during the manual driving mode. One such example is a request that the driver to enter a driving route or confirm a predicted or scheduled driving route. While this request is ideally fulfilled prior to the trip, human nature is to begin driving without spending the time to do so.

Therefore, at least one example object of some of the example embodiments described herein is to provide useful navigation information to the driver with no direct interaction with the driver while the vehicle is in a manual driving mode. In particular, in the instance when the vehicle is driving without a planned route, or the driver has deviated from a predicted routine, the example embodiments may be used to direct the vehicle to a certified autonomous road. Once the vehicle is in an autonomous driving mode, a navigation unit may engage the driver with requests to verify a driving route. Thus, the driver is only engaged in providing necessary information only when the vehicle is in the autonomous driving mode.

An advantage of the example embodiments presented herein is that the driver may devote his or her full attention to the operation of the vehicle while the vehicle is in the manual driving mode.

The example embodiments are directed towards a navigation unit that provides instructions for an autonomous vehicle configured to be in an autonomous driving mode while in a certified autonomous road. The navigation unit comprises a processing unit configured to determine the autonomous vehicle is driving on an unplanned route or is deviating from a planned route that is determined by the driver or predicted by past events. The navigation unit further comprises a trigger unit configured to identify a trigger for directing the driver of the autonomous vehicle to the certified autonomous road. The trigger is based on at least one of a current location, a time and date, a driving history, or a calendar event. The processing unit is further configured to navigate the autonomous vehicle to the certified autonomous road based on, at least in part, the determination that the autonomous vehicle is driving on the unplanned route or is deviating from the planned route and the identified trigger. The navigation unit further comprises a display screen. Upon entering the certified autonomous road, the display screen is configured to display a navigation menu where a driver inputs route planning information, wherein the driver is only engaged for navigation input when the vehicle is in the autonomous driving mode.

According to some of the example embodiments, the trigger unit may be configured to identify the trigger based on the current location via an identification that the current location has been visited a number of times that is below a visit threshold. Thus, the trigger unit is configured to identify that the vehicle is in a location that is not frequently visited. Therefore, the vehicle may be navigated to the certified autonomous driving road so that the driver may select a driving route. An example advantage of such a trigger is that the navigation unit may predict the driver's need for navigation assistance without interacting with the driver during the manual driving mode.

According to some of the example embodiments, the trigger unit is configured to identify the trigger based on the current location via an identification that the current location is located within a predetermined distance to a frequent location that has been visited a number of times above a visit threshold. Thus, navigation instructions may also be provided based on the detection of being in close proximity to a frequently visited location.

According to some of the example embodiments, the trigger unit is configured to identify the trigger based on the driving history via an identification that a current driving path is not an expected driving path given the driving history on a given time and day. Thus, the navigation unit may detect that the driver is not following his or her normal driving routine and therefore may direct the vehicle to a certified autonomous driving road in anticipation of a trip that can benefit from autonomous driving.

According to some of the example embodiments, the processing unit is configured to halt the navigation to the certificated autonomous road if the autonomous vehicle does not follow the provided navigation for a period of time greater than a navigation threshold time period. Therefore, if the vehicle is provided with navigation instructions to the certified autonomous road but the driver does not follow the directions, the navigation unit will stop directing the driver to the certified road. This has the example advantage of not distracting the driver with unnecessary driving directions.

According to some of the example embodiments, upon halting the navigation to the certified autonomous road, processing unit is configured to predict a new route for navigation based a current location, a time and date, a driving history, and/or a calendar event. Thus, the navigation unit may continue to provide navigation instructions to the driver without requiring any interaction with the driver during the manual driving mode. Driver's refusal to follow driving direction is thus used by the navigation unit to better predict the intended destination and the subsequent driving directions.

According to some of the example embodiments, the processing unit is further configured to re-navigate the autonomous vehicle to the certified autonomous road upon the trigger unit identifying the trigger after a time period above a re-navigation threshold time period. Consider the example of where the navigation unit provides navigation to the certified autonomous road then halts the navigation as described above because the driver took a detour, for example, to obtain gas for the vehicle. Thereafter, the navigation unit may detect, after a period of time, a trigger and resume the navigation to the certified autonomous road. Such navigation has the example advantage of providing a flexible means of instructing the driver such that the driver will be navigated to the autonomous road even if such detours are taken.

According to some of the example embodiments, the processing unit is further configured to predict a certified autonomous road and/or a direction on the certified autonomous road to navigate the autonomous vehicle based on the trigger and/or at least one predefined rule. An example of such a predefined rule may be to head a specified direction on the certified road toward the location that the next item in the user's calendar is scheduled to take place. Such a rule may be used to assist the navigation unit in providing navigation to be most beneficial when starting from an unfamiliar locale as determined from past history. Such predefined rules may be user programmable and provided by the driver. This has the example advantage of providing an accurate means of navigation without needing to interact with the driver during the manual driving mode.

According to of the example embodiments, the at least one predefined rule is based on a certified autonomous road which provides a greatest amount of uninterrupted autonomous driving time to a destination with acceptable added distance, or a fastest route to a predicted destination, or a route that has been designated as being preferred by the driver. Such preferences may be provided by the driver or based on past history.

The example embodiments are also directed towards a vehicle comprising the navigation unit featuring any of the example embodiments described above.

The example embodiments are further directed towards a computer readable medium comprising program instructions for providing navigation instructions for an autonomous vehicle configured to be in an autonomous driving mode while in a certified autonomous road. The execution of the program instructions by one or more processors of a computer system causes the one or more processors to carry out the steps of determining the autonomous vehicle is driving on an unplanned route or the autonomous vehicle is deviating from a planned route. The processors are also configured to carry out the step of identifying a trigger for routing the autonomous vehicle to the certified autonomous road, the trigger being based on at least one of a current location, a time and date, a driving history, or a calendar event. An additional step being carried out is navigating the autonomous vehicle to the certified autonomous road based on, at least in part, the determining and the identifying. A further step is upon entering the certified autonomous road, displaying, on a display screen, a navigation menu where a driver may input route planning information. It should be appreciated that the driver is only engaged for navigation input when the vehicle is in the autonomous driving mode.

According to some of the example embodiments, the execution of the program instructions by one or more processors of a computer system further causes the one or more processors to carry out the step of halting the navigation to the certificated autonomous road if the autonomous vehicle does not follow the provided navigation for a period of time above a navigation threshold time period.

According to some of the example embodiments, the execution of the program instructions by one or more processors of a computer system further causes the one or more processors to carry out the step of re-navigating the autonomous vehicle to the certified autonomous road upon the trigger unit identifying the trigger and after a time period above a re-navigation threshold time period.

According to some of the example embodiments, the execution of the program instructions by one or more processors of a computer system further causes the one or more processors to carry out the step of predicting a certified autonomous road and/or a direction on the certified autonomous road to navigate the autonomous vehicle based on the trigger and/or at least one predefined rule.

According to some of the example embodiments, the at least one predefined rule is based on a certified autonomous road and/or direction on the certified autonomous road which provides a greatest amount of uninterrupted autonomous driving time to a destination with acceptable added distance, or a fastest route to a predicted destination, or a route that has been designated as being preferred by the driver.

The example embodiments are further directed towards a method for providing navigation instructions for an autonomous vehicle configured to be in an autonomous driving mode while in a certified autonomous road. The method comprises determining, with a processing unit, the autonomous vehicle is driving on an unplanned route or the autonomous vehicle is deviating from a planned route. The method further comprises identifying a trigger for routing the autonomous vehicle to the certified autonomous road. The trigger is based on at least one of a current location, a time and date, a driving history, or a calendar event. The method further comprises navigating the autonomous vehicle to the certified autonomous road based on, at least in part, the determining and the identifying. Upon entering the certified autonomous road, the method further comprises displaying, on a display screen, a navigation menu where a driver may input route planning information. It should be appreciated that the driver is only engaged for navigation input when the vehicle is in the autonomous driving mode.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments. However, it will be apparent to one skilled in the art that the example embodiments may be practiced in other manners that depart from these specific details. In other instances, detailed descriptions of well-known methods and elements are omitted so as not to obscure the description of the example embodiments. The terminology used herein is for the purpose of describing the example embodiments and is not intended to limit the embodiments presented herein. The example embodiments presented herein are described with the use of a vehicle in the form of an automobile. It should be appreciated that the example embodiments presented herein may be applied to any form of vehicle or means of transportation comprising, for example, cars, trucks, busses and construction equipment, as well as airplanes, boats, ships, and space craft.

Autonomous driving allows an occupant of a vehicle, particularly a driver, to engage in activities that would otherwise not be possible while a vehicle is in a manual driving mode. In contrast, a driver must have his or her full attention on the operation of the vehicle while the vehicle is in a manual driving mode.

It is likely that the entire driving route will not involve autonomous driving. Furthermore, it is likely that the initial portion of a driving route will comprise a manual driving mode since autonomous driving will only be allowed on certified roads. Thus, in order to not to distract the driver while the vehicle is in a manual driving mode, it may be beneficial to limit any requests to the driver for information during the manual driving mode. An example of such a request is a navigation related request. A navigation request may involve a navigation unit to request the driver to enter a driving route or confirm a predicted or scheduled driving route. While vehicle systems will work best if the driver's desired destination is provided before the starting, it is human nature to start driving as soon as entering the vehicle.

Therefore, at least one example object of the example embodiments described herein is to provide a means of navigation for a vehicle while minimizing an interaction with the driver while the vehicle is in a manual driving mode. In particular, in the instance when the vehicle is driving without a planned route, or the vehicle has deviated from a planned route to a destination provided by the driver or predicted based on past history, the example embodiments may be used to direct the vehicle to a certified autonomous road. Once the vehicle is in an autonomous driving mode, a navigation unit may engage the driver to verify a driving route. Thus, the driving is only engaged once the vehicle is in the autonomous driving mode.

An advantage of the example embodiments presented herein is that the driver may devote his or her attention to the operation of the vehicle while the vehicle is in the manual driving mode.

Figure 1:
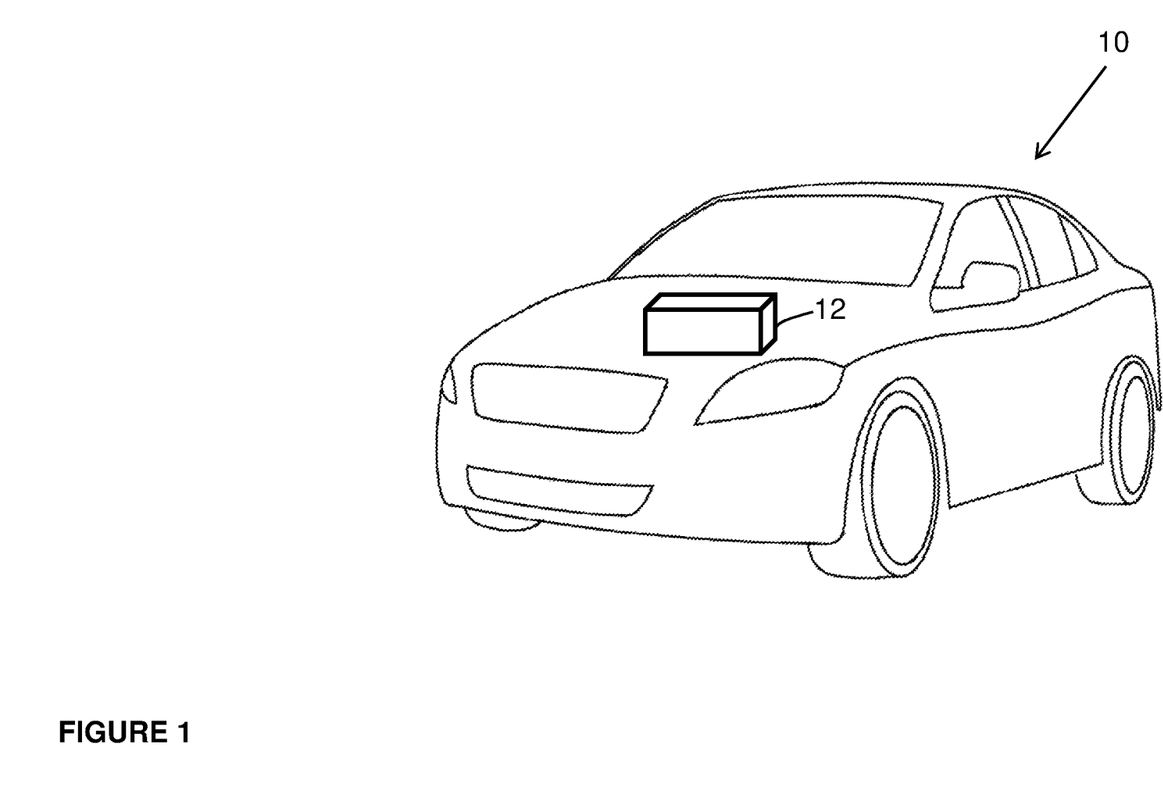
FIG. 1 is an illustration of a vehicle featuring a navigation unit, according to the example embodiments presented herein.

FIG. 1 illustrates a vehicle 10 comprising a navigation unit 12. The vehicle 10 is capable of operating in an autonomous driving mode and in a manual driving mode. The navigation unit 12 is illustrated as being comprised in a front compartment of the vehicle 10. It should be appreciated that the navigation unit 12 may be comprised anywhere within the vehicle. According to the example embodiments, while the vehicle is in the initial manual driving mode, the navigation unit will detect a triggering event in which the navigation unit will navigate the vehicle to a certified autonomous road. The triggering event may be based on any one of a scheduled calendar event, a driving history, a current location of the vehicle and/or a current time or date.

Once the vehicle is in the certified autonomous road, the navigation unit will engage the driver for receiving or confirming a driving route. The navigation unit comprises a display screen for providing the driver with navigation related information as well as receiving any inputs from the driver.

Figure 2:
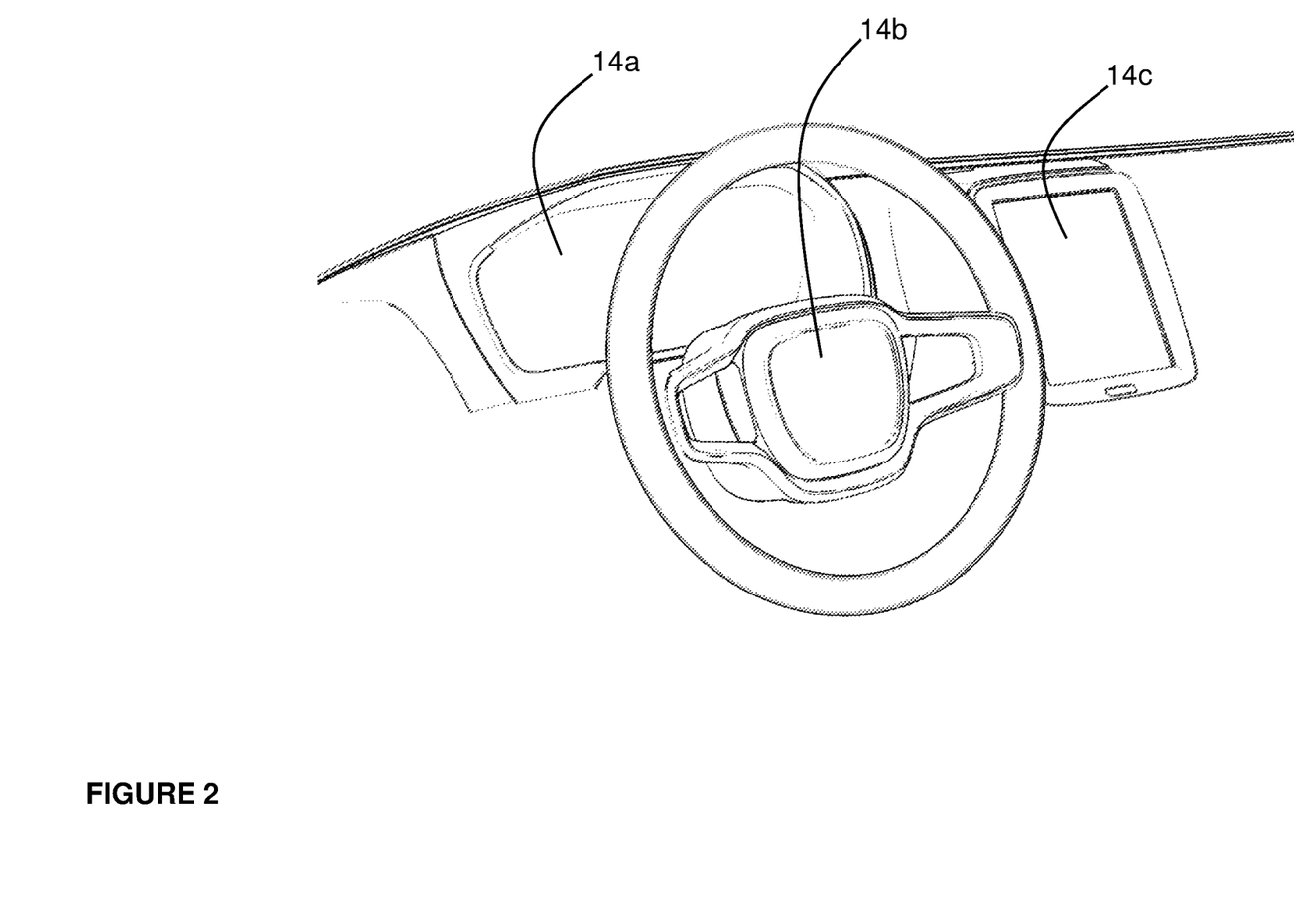
FIG. 2 is an illustration of an interior of a vehicle featuring example locations of a display screen of the navigation unit, according to the example embodiments presented herein.

FIG. 2 illustrates various example locations for a display screen 14a-14c of the navigation unit. The display screen 14a may be comprised within the instrument panel of the front compartment of the vehicle, for example, above the steering wheel. Another example location of the display screen 14b may be within the steering wheel itself. A further example location of the display screen 14c may be within a central panel in the instrument panel. It should be appreciated that the display screen may be located anywhere within the interior of the vehicle. It should further be appreciated that the display screen may be in a fixed location or may be detachable.

According to some of the example embodiments, the display screen may be in the form of a touch screen display. The display screen is configured to illustrate navigational instructions to the driver as well as receive any inputs, route information or driving commands for the driver or an occupant of the vehicle.

Figure 3:
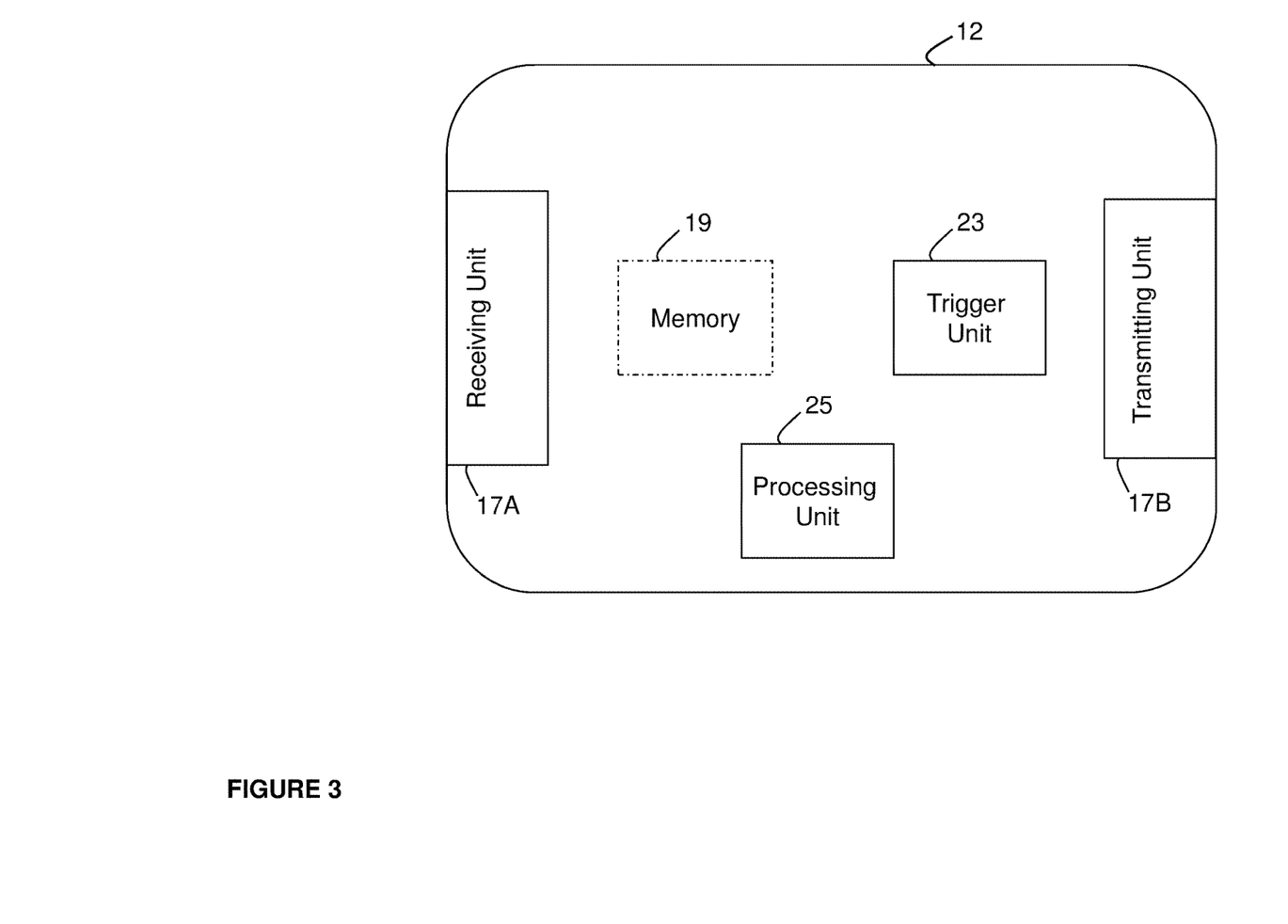
FIG. 3 is an example configuration of the navigation unit, according to the example embodiments presented herein.

FIG. 3 illustrates an example configuration of the navigation unit 12. The navigation unit may perform the example embodiments described herein. The navigation unit may comprise radio circuitry, a communication port or a communications module. Specifically, the navigation unit 12 may comprise a receiving unit 17A or a transmitting unit 17B that may be configured to receive and/or transmit navigation related information, instructions, and/or messages. It should be appreciated that the receiving unit 17A or the transmitting unit 17B may be comprised as any number of transceiving, receiving, and/or transmitting units, modules or circuitry. It should further be appreciated that the receiving unit 17A and/or the transmitting unit 17B may be in the form of any input or output communications port known in the art.

The navigation unit may also comprise a trigger unit or circuitry 23, which may be configured to a trigger event in which the vehicle shall be navigated to a certified autonomous road. The navigation unit may further comprise a processing unit 25 that is configured to process the navigation instructions as described herein. The trigger unit 23 and the processing unit 25 may be any suitable type of computation unit, for example, a microprocessor, digital signal processor (DSP), field programmable gate array (FPGA), or application specific integrated circuit (ASIC), or any other form of circuitry or module. It should be appreciated that the trigger unit 23 and the processing unit 25 may be comprised as a single unit or any number of units.

The navigation unit 12 may further comprise a memory unit or circuitry 19 which may be any suitable type of computer readable memory and may be of volatile and/or non-volatile type. The memory unit 19 may be configured to store received, transmitted, and/or data related to navigation, and/or executable program instructions or any other form of information described herein.

Figure 4:
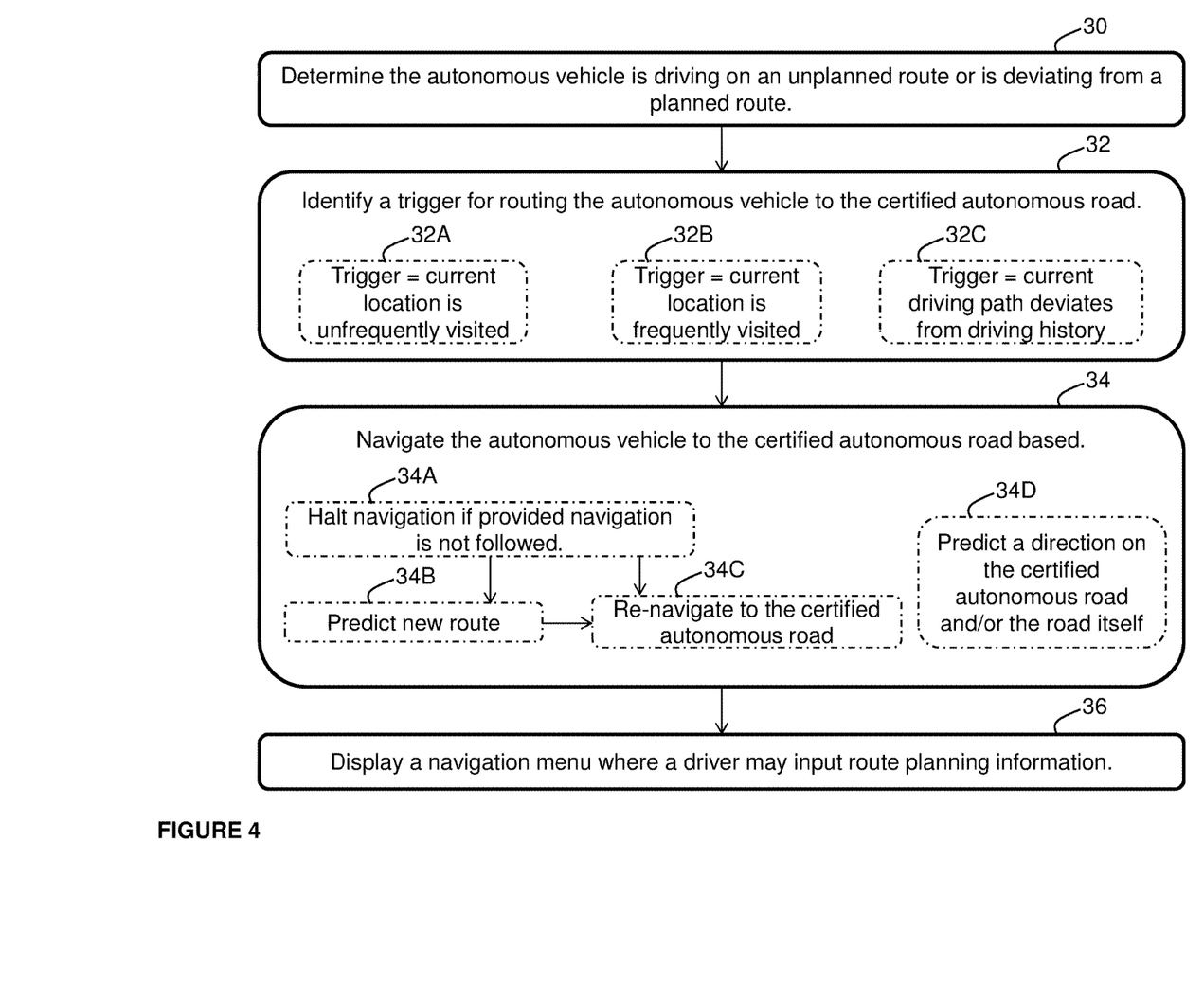
FIG. 4 is a flow diagram illustrating example operations that may be taken by the navigation unit of FIGS. 1-4, according to the example embodiments presented herein.

FIG. 4 is a flow diagram depicting example operations that may be taken by a navigation unit for navigating the vehicle to a certified autonomous road as described herein. It should also be appreciated that FIG. 4 comprises some operations that are illustrated with a solid border and some operations that are illustrated with a dashed border. The operations that are comprised in a solid border are operations, which are comprised in the broadest example embodiment. The operations that are comprised in a dashed border are example embodiments, which may be comprised in, or a part of, or are further operations that may be taken in addition to the operations of the boarder example embodiments. It should be appreciated that these operations need not be performed in order. Furthermore, it should be appreciated that not all of the operations need to be performed. The example operations may be performed in any order and in any combination.

Operation 30

The navigation unit 12 is configured to determine 30 that the autonomous vehicle is driving on an unplanned route or the autonomous vehicle is deviating from a planned route. The processing unit 25 is configured to determine that the autonomous vehicle is driving on an unplanned route or the autonomous vehicle is deviating from a planned route.

In such instances where the planned route is based on destination predicted from past history, it is beneficial to engage the driver to input or confirm a driving route. According to the example embodiments presented herein, such engagement is enabled only while the vehicle is in the autonomous driving mode. Thus, the vehicle will first be directed to a certified autonomous road unless the driver follows a planned route that does require it. Once the vehicle has entered in an autonomous driving mode, the driver will be engaged for route input or confirmation.

Operation 32

The navigation unit 12 is further configured to identify a trigger for routing the autonomous vehicle to the certified autonomous road. The trigger is based on at least one of a current location, a time and date, a driving history or a calendar event. The triggering unit 23 is configured to identify the trigger for routing the vehicle to the certified autonomous road.

Thus, in addition to determining that the vehicle does not have a planned route, or has deviated from a planned route, a trigger is identified, after which the vehicle will be directed to a certified autonomous road for route input or confirmation. Operations 30 and 32 have the example advantage of reducing the likelihood that navigation to the certified autonomous road will be provided unnecessarily, as operations 30 and 32 provide a two-step confirmation in determining if such navigation shall be provided.

Example Operation 32A

According to some of the example embodiments, the identification of the trigger may comprise identifying 32A the trigger based on the current location via an identification that the current location has been visited a number of times that is below a visit threshold. The trigger unit 23 may be configured to identify the trigger based on the current location via the identification that the current location has been visited a number of times that is below a visit threshold.

The visit threshold may represent a number of visits in which if the vehicle is in a location that has been visited a number of times below the visit threshold, the current location will be deemed a location that is not frequently visited. Thus, in comparing the number of visits the vehicle has made in the current location, with that of the visit threshold, the driving history may be accessed. It should be appreciated that the visit threshold may be a user programmable value or may be a preconfigured value within the navigation unit.

Therefore, if the vehicle is in a location that is not frequently visited, the navigation unit may determine that the vehicle is in need for navigation assistance. Thus, the vehicle may be navigated to the certified autonomous driving road so that the driver may select a driving route. An advantage of such a trigger is that the navigation unit may predict the driver's need for navigation assistance without interacting with the driver during the manual driving mode.

In cases where current location is below a visit threshold, driver is assumed to be unfamiliar with the locale. According to some of the example embodiments, secondary driving directions can be displayed to certain points of interest such as fueling stations and restaurants based on driver's brand preferences. This function can also be conditional on factors not limited to time, location, and vehicle fuel status.

Example Operation 32B

According to some of the example embodiments, the identification of the trigger may comprise identifying 32B the trigger based on the current location via an identification that the current location is located within a predetermined distance to a frequent location that has been visited a number of times above a visit threshold. The trigger unit 23 may be configured to identify the trigger based on the current location via the identification that the current location is located within a predetermined distance to a frequent location that has been visited a number of times above a visit threshold.

The visit threshold may represent a number of visits in which if the vehicle is in a location that has been visited a number of times above the visit threshold, the current location will be deemed a location that is frequently visited (i.e., the frequent location). Thus, in example operation 32B, the navigation unit 12 may be configured to determine if the current location is in close proximity (i.e., is within a predetermined distance) to a frequently visited location (i.e., the frequent location). In comparing the number of visits the vehicle has made in the current location, with that of the visit threshold, the driving history may be accessed.

Thus, upon the detection that the vehicle is in close proximity to a frequently visited location, the vehicle may be navigated to the certified autonomous road where the driver may be engaged for route input or confirmation when the vehicle is in an autonomous driving mode. An advantage of such a trigger is that the navigation unit may predict the driver's need for navigation assistance without interacting with the driver during the manual driving mode.

Example Operation 32C

According to some of the example embodiments, the identification of the trigger may comprise identifying 32C that the trigger is based on the driving history via an identification that a current driving path is not an expected riving path given the driving history on a given time and day. The trigger unit 23 is configured to identify that the trigger is based on the driving history via the identification that a current driving path is not an expected riving path given the driving history on a given time and day.

Thus, the navigation unit may detect that the driver is not following his or her normal driving routine and therefore may direct the vehicle to a certified autonomous driving road to verify or request the input of a navigation route. An advantage of such a trigger is that the navigation unit may predict the driver's need for navigation assistance without interacting with the driver during the manual driving mode.

Operation 34

The navigation unit 12 is further configured to navigate the autonomous vehicle to the certified autonomous road based on, at least in part, the determining (e.g., operation 30) and the triggering (e.g., any of operations 32 and 32A-32C) described above. The processing unit 25 is configured to navigate the autonomous vehicle to the certified autonomous road based on, at least in part, the determining and the triggering described above.

It should be appreciated that during the navigation to the certified autonomous road, the navigation unit may highlight locations which may be of interest to the driver which appear along the route. For example, on the way to the certified autonomous road, the navigation unit may indicate that a frequently visited coffee shop or gas station is in close proximity. Such suggestions may be made based on a driving history and/or user provided preferences.

Example Operation 34A

According to some of the example embodiments, the navigation 34 further comprises halting 34A the navigation to the certified autonomous road if the vehicle does not follow the provided navigation for a period of time greater than a navigation threshold time period. The processing unit 25 is configured to halt the navigation to the certified autonomous road if the vehicle does not follow the provided navigation for a period of time greater than a threshold time period.

The navigation threshold may represent a time period in which is the vehicle deviates from the provided navigation for a period of time greater than the navigation threshold, the navigation unit 12 will recognize that the driver does not intend to follow the provided navigation to the certified autonomous road. Thereafter, the navigation will be halted. It should be appreciated that the navigation threshold may be user programmable or preconfigured within the navigation unit. Operation 34A has the example advantage of not providing the driver with unnecessary driving navigation.

Example Operation 34B

According to some of the example embodiments, upon the halting of the navigation to the certified autonomous road (i.e., example operation 34A), the navigation unit 12 may be further configured to predict a new route for navigation based on a current location, time and date, driving history, and/or a calendar event. The processing unit 25 is configured to predict the new route for navigation based on the current location, time and date, driving history, and/or a calendar event.

Thus, the navigation unit may continue to provide navigation instructions to the driver without requiring any interaction with the driver during the manual driving mode. An example of a predicted new route may be navigating the vehicle to a gas station or coffee shop the driver may frequently visit during a particular time or day. Operation 34B has the example advantage of being able to continue to assist the driver with navigation without requiring any interaction with the driver during the manual driving mode of the vehicle.

Example Operation 34C

According to some of the example embodiments, upon the halting 34A and/or predicting 34B, the navigation 34 may further comprise re-navigating 34C the autonomous vehicle to the certified autonomous road upon an identification of the trigger after a time period above a re-navigation threshold time period. The processing unit 25 may be configured to re-navigate the autonomous vehicle to the certified autonomous road upon the trigger unit 23 identifying the trigger after a time period above a re-navigation threshold time period.

Consider the example of where the navigation unit provides navigation to the certified autonomous road then halts the navigation as described above because the driver took a detour, for example, to obtain gas for the vehicle. Thereafter, the navigation unit may detect, after a period of time (i.e., the re-navigation threshold time period), a trigger and resume the navigation to the certified autonomous road. Such navigation has the example advantage of providing a flexible means of instructing the driver such that the driver will be navigated to the autonomous road even if such detours are taken. It should be appreciated that the re-navigation threshold time period may be user programmable or predefined in the navigation unit 12.

Example Operation 34D

According to some of the example embodiments, the navigation 34 may further comprise predicting 34D a certified autonomous road and/or direction on the certified autonomous road to navigate the autonomous vehicle based on the trigger and/or at least one predefined rule. The processing unit 25 is configured to predict the certified autonomous road and/or direction on the certified autonomous road based on the trigger and/or at least one predefined rule.

According to some of the example embodiments, the at least one predefined rule is based on a certified autonomous road and/or direction on the certified autonomous road which provides a longest uninterrupted amount of autonomous driving time to a destination with acceptable added distance, a fastest route to a destination, or a route that has been designated as being preferred by the driver.

An example of such a predefined may be to head a specified direction on the certified autonomous road toward the location that the next item in the user's calendar is scheduled to take place. Such a predefined rule may assist the navigation unit in providing navigation to be most beneficial when starting the trip from an unfamiliar locale as determined from past history. The predefined rules may be user programmable and provide by the driver. Such rules have the example advantage of providing an accurate means of navigation without needing to interact with the driver during the manual driving mode.

Operation 36

Upon entering the certified autonomous road, in which the vehicle will be in an autonomous driving mode, the navigation unit 12 is further configured to display 36 a navigation menu where a driver may input route planning information. The driver is only engaged for navigation input when the vehicle is in the autonomous driving mode. The display screen 14a-14c is configured to display the navigation menu where the driver may input route planning information.

According to some of the example embodiments, several likely final destinations may be predicted. The driver may be requested to select one of the predicted routes or input a different desired route. The predicted routes may be provided based on a driving history or any preconfigured rules or preferences provided by the driver.

Selecting a final destination allows the navigation system to compute the earliest time of arrival and corresponding time that the vehicle ill drive autonomously. Combining this with any other information that is available to the driver that is relieved of driving, decisions may be made to add stops to the trip or allocate sufficient time for the driver to accomplish a task while on route. For example, an appointment calendar may be safely consulted to see how much time may be added to the trip for stops as well as what are offered at potential stops along the route (e.g., in consideration of fuel prices, menus, etc.).

If stops along the route are selected, past history may be consulted for stop duration that is considered in revising the earliest time of arrival. The display screen 14a-14c may provide a user interface which allows the driver to select a longer stop. All routes compared by the navigation system for obtaining an earliest time of arrival may be saved in a cache so that the driver has the option of selecting an alternative route that offers a longer period of autonomous driving time at the expense of the arrival time.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

What is claimed is:

1. A navigation unit for providing navigation instructions for an autonomous vehicle, the autonomous vehicle capable of operating alternatively in an autonomous driving mode in which the autonomous vehicle operates without human input and a manual driving mode in which the operation of the autonomous vehicle requires human input, wherein the autonomous vehicle is configured to operate in the autonomous driving mode while on a certified autonomous road, the certified autonomous road being approved for autonomous driving, the navigation unit comprising:
   a processing unit configured to determine, while the autonomous vehicle is in the manual driving mode, that the autonomous vehicle is driving on an unplanned route or the autonomous vehicle is deviating from a planned route;
   a trigger unit configured to identify, while the autonomous vehicle is in the manual driving mode, a trigger for navigating the autonomous vehicle to a selected certified autonomous road, the trigger being based on at least one of a current location, a time and date, a driving history, or a calendar event;
   the processing unit configured to navigate, while the autonomous vehicle is in the manual driving mode, the autonomous vehicle to the selected certified autonomous road based on at least (i) the determination that the autonomous vehicle is driving on the unplanned route or is deviating from the planned route and (ii) the identified trigger; and
   a display screen configured to display a navigation menu upon entering the selected certified autonomous road and as a result of the autonomous vehicle entering the autonomous driving mode, the navigation menu being where a driver inputs route planning information, wherein the driver is only prompted to provide navigation input in response to the vehicle having entered the autonomous driving mode.

2. The navigation unit of claim 1, wherein the trigger unit is configured to identify the trigger based on the current location via an identification that the current location has been visited a number of times that is below a visit threshold.

3. The navigation unit of claim 1, wherein the trigger unit is configured to identify the trigger based on the current location via an identification that the current location is located within a predetermined distance to a frequent location that has been visited a number of times above a visit threshold.

4. The navigation unit of claim 1, wherein the trigger unit is configured to identify the trigger based on the driving history via an identification that a current driving path is not an expected driving path given the driving history on a given time and day.

5. The navigation unit of claim 1, wherein the processing unit is configured to halt the navigation to the certificated autonomous road if the autonomous vehicle does not follow the provided navigation for a period of time greater than a navigation threshold time period.

6. The navigation unit of claim 5, wherein upon halting navigation to the certified autonomous road, processing unit is configured to predict a new route for navigation based a current location, a time and date, a driving history, or a calendar event.

7. The navigation unit of claim 5, wherein the processing unit is further configured to re-navigate the autonomous vehicle to the certified autonomous road upon the trigger unit identifying the trigger after a time period above a re-navigation threshold time period.

8. The navigation unit of claim 1, wherein the processing unit is further configured to predict a certified autonomous road or a direction on the certified autonomous road to navigate the autonomous vehicle based on the trigger or at least one predefined rule.

9. The navigation unit of claim 8, wherein the at least one predefined rule is based on a certified autonomous road or direction on the certified autonomous road which provides a longest uninterrupted amount of autonomous driving time to a destination with acceptable added distance, a fastest route to a destination, or a route that has been designated as being preferred by the driver.

10. A vehicle comprising the navigation unit of claim 1.

11. A non-transitory computer readable medium comprising program instructions for providing navigation instructions for an autonomous vehicle, the autonomous vehicle capable of operating alternatively in an autonomous driving mode in which the autonomous vehicle operates without human input and a manual driving mode in which an operation of the autonomous vehicle requires human input, wherein the autonomous vehicle is configured to operate in the autonomous driving mode while on a certified autonomous road, the certified autonomous road being approved for autonomous driving, wherein execution of the program instructions by one or more processors of a computer system causes the one or more processors to carry out the steps of:

determining, with a processing unit, while the autonomous vehicle is in the manual driving mode, that the autonomous vehicle is driving on an unplanned route or the autonomous vehicle is deviating from a planned route;

identifying a trigger for navigating the autonomous vehicle to a selected certified autonomous road while the autonomous vehicle is in the manual driving mode, the trigger being based on at least one of a current location, a time and date, a driving history, or a calendar event;

navigating the autonomous vehicle to the selected certified autonomous road based on at least the determining and the identifying; and displaying, on a display screen, a navigation menu upon entering the selected certified autonomous road and as a result of the autonomous vehicle entering the autonomous driving mode, the navigation menu being where a driver inputs route planning information, wherein the driver is only prompted to provide navigation input in response to the vehicle having entered the autonomous driving mode.

12. The computer readable medium of claim 11, wherein the execution of the program instructions by one or more processors of a computer system further causes the one or more processors to carry out the steps of:

halting the navigation to the certificated autonomous road if the autonomous vehicle does not follow the provided navigation for a period of time above a navigation threshold time period.

13. The computer readable medium of claim 12, wherein the execution of the program instructions by one or more processors of a computer system further causes the one or more processors to carry out the steps of:

re-navigating the autonomous vehicle to the certified autonomous road upon identifying the trigger and after a time period above a re-navigation threshold time period.

14. The computer readable medium of claim 11, wherein the execution of the program instructions by one or more processors of a computer system further causes the one or more processors to carry out the steps of:

predicting a certified autonomous road or a direction on the certified autonomous road to navigate the autonomous vehicle based on the trigger and/or at least one predefined rule.

15. The computer readable medium of claim 14, wherein the at least one predefined rule is based on a certified autonomous road or direction on the certified autonomous road which provides a longest uninterrupted amount of autonomous driving time to a destination with acceptable added distance, a fastest route to a destination, or a route that has been designated as being preferred by the driver.

16. A method for providing navigation instructions for an autonomous vehicle, the autonomous vehicle capable of operating alternatively in an autonomous driving mode in which the autonomous vehicle operates without human input and a manual driving mode in which an operation of the autonomous vehicle requires human input, wherein the autonomous vehicle is configured to operate in the autonomous driving mode while on a certified autonomous road, the certified autonomous road being approved for autonomous driving, the method comprising:

determining, with a processing unit, while the autonomous vehicle is in the manual driving mode, that the autonomous vehicle is driving on an unplanned route or the autonomous vehicle is deviating from a planned route;

identifying a trigger for navigating the autonomous vehicle to a selected certified autonomous road while the autonomous vehicle is in the manual driving mode, the trigger being based on at least one of a current location, a time and date, a driving history, or a calendar event;

navigating the autonomous vehicle to the selected certified autonomous road, while the autonomous vehicle is in the manual driving mode, based on at least the determining and the identifying; and displaying, on a display screen, a navigation menu upon entering the certified autonomous road and as a result of the autonomous vehicle entering the autonomous driving mode, the navigation menu being where a driver inputs route planning information, wherein the driver is only prompted to provide navigation input in response to the vehicle having entered the autonomous driving mode.

* * * * *

UNITED STATES PATENT AND TRADEMARK OFFICE
CERTIFICATE OF CORRECTION

PATENT NO. : 10,504,052 B2
APPLICATION NO. : 14/991260
DATED : December 10, 2019
INVENTOR(S) : Ichiro Sugioka et al.

Page 1 of 1

It is certified that error appears in the above-identified patent and that said Letters Patent is hereby corrected as shown below:

In the Claims

Column 12, Line 61, Claim 6:
After "road," and before "processing unit"
Insert -- the --.

Column 12, Line 62, Claim 6:
After "route for navigation based"
Insert -- on --.

Signed and Sealed this
Seventh Day of April, 2020

Andrei Iancu
*Director of the United States Patent and Trademark Office*